United States Patent [19]
Meatto et al.

[11] Patent Number: 6,012,709
[45] Date of Patent: Jan. 11, 2000

[54] HYBRID LEAF SPRING AND SUSPENSION SYSTEM FOR SUPPORTING AN AXLE ON A VEHICLE

[75] Inventors: Frank Meatto, Ridgeway, Colo.; Edward Pilpel, Avon, Conn.; D. Michael Gordon, Montrose, Conn.; David C. Gordon, Jr., Vista, Calif.

[73] Assignee: Pacific Coast Composites, Montrose, Colo.

[21] Appl. No.: 08/906,747

[22] Filed: Aug. 6, 1997

[51] Int. Cl.[7] ..................................................... B60G 11/02
[52] U.S. Cl. ............................................. 267/36.1; 267/47
[58] Field of Search ................................ 267/37.1, 36.1, 267/37.2, 47, 49, 50, 30

[56] References Cited

U.S. PATENT DOCUMENTS

| | | |
|---|---|---|
| 1,922,781 | 8/1933 | Rogers et al. . |
| 2,188,689 | 1/1940 | Marco . |
| 2,667,347 | 1/1954 | Jacobs ..................................... 267/37.1 |
| 2,698,750 | 1/1955 | Nicosia et al. .......................... 267/37.1 |
| 2,861,798 | 11/1958 | Lenet et al. . |
| 2,969,230 | 1/1961 | Scheublein, Jr. et al. . |
| 3,204,944 | 9/1965 | Brownyer .................................. 267/47 |
| 3,586,307 | 6/1971 | Brownyer .................................. 267/47 |
| 3,698,702 | 10/1972 | Beck ......................................... 267/47 |
| 4,508,325 | 4/1985 | Marsh ....................................... 267/47 |
| 4,519,591 | 5/1985 | Bush et al. ............................... 267/148 |
| 4,557,500 | 12/1985 | Collard et al. . |
| 4,565,356 | 1/1986 | Nickel . |
| 4,575,057 | 3/1986 | Robertson . |
| 5,087,503 | 2/1992 | Meatto . |
| 5,225,008 | 7/1993 | Koyama et al. ......................... 148/580 |
| 5,258,082 | 11/1993 | Koyama et al. ......................... 148/908 |

FOREIGN PATENT DOCUMENTS

| | | |
|---|---|---|
| 0 162 191 | 2/1985 | European Pat. Off. . |
| 2 601 905 | 1/1988 | France . |
| 3236330 | 5/1983 | Germany . |
| 53-127958 | 11/1978 | Japan . |
| 54-022048 | 2/1979 | Japan . |
| 54-025986 | 2/1979 | Japan . |
| 54-074057 | 6/1979 | Japan . |
| 54-074058 | 6/1979 | Japan . |
| 54-079343 | 6/1979 | Japan . |
| 54-141852 | 11/1979 | Japan . |
| 54-141944 | 11/1979 | Japan . |
| 55-027522 | 2/1980 | Japan . |
| 55-036644 | 3/1980 | Japan . |
| 55-086934 | 7/1980 | Japan . |
| 55-086935 | 7/1980 | Japan . |
| 55-087606 | 7/1980 | Japan . |
| 55-86934 | 7/1980 | Japan . |
| 55-107138 | 8/1980 | Japan . |
| 56-094041 | 3/1981 | Japan . |
| 56-120835 | 9/1981 | Japan . |
| 57-043035 | 3/1982 | Japan . |
| 57-043036 | 3/1982 | Japan . |
| 57-101140 | 6/1982 | Japan . |
| 59-089843 | 5/1984 | Japan . |
| 85-002540 | 1/1985 | Japan . |
| 60-220233 | 11/1985 | Japan . |
| 62-20926 | 1/1987 | Japan . |
| 2 125 514 | 3/1984 | United Kingdom . |

*Primary Examiner*—Robert J. Oberleitner
*Assistant Examiner*—Jeffrey Woller
*Attorney, Agent, or Firm*—McCormick, Paulding & Huber LLP

[57] ABSTRACT

In a hybrid leaf spring, an elongated primary leaf element is provided having a first modulus of elasticity, a tension surface, and a compression surface. At least one layer of composite material is substantially parallel to and bonded to the tension surface of the primary leaf element with at least a second layer of composite material bonded to the compression surface of the primary leaf. The primary leaf element can also include mounting eyes coupled to the ends of the primary leaf element for mounting the hybrid leaf spring to the frame of a vehicle. The hybrid leaf spring can also include multiple layers of composite material bonded to both the tension and compression surfaces of the primary leaf spring.

28 Claims, 6 Drawing Sheets

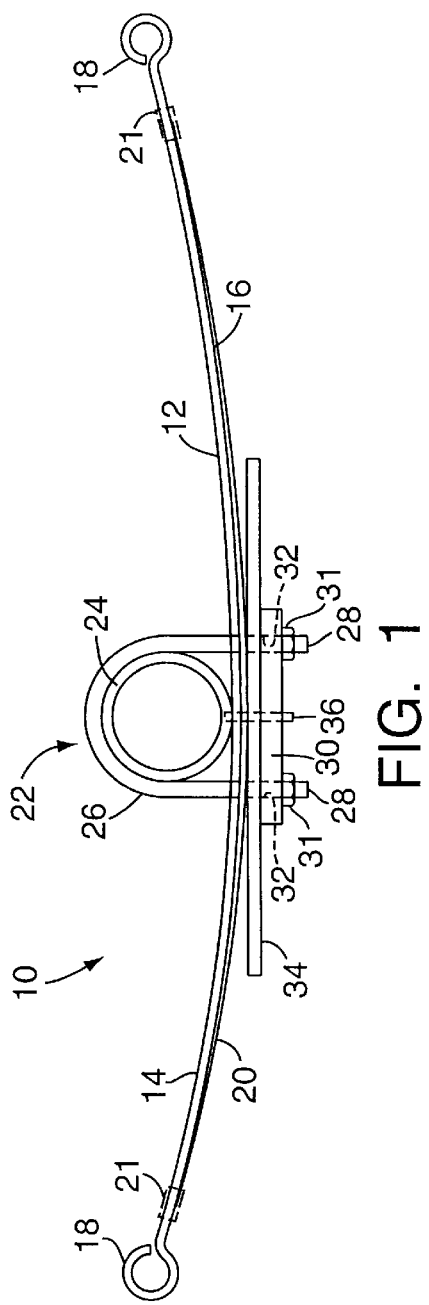
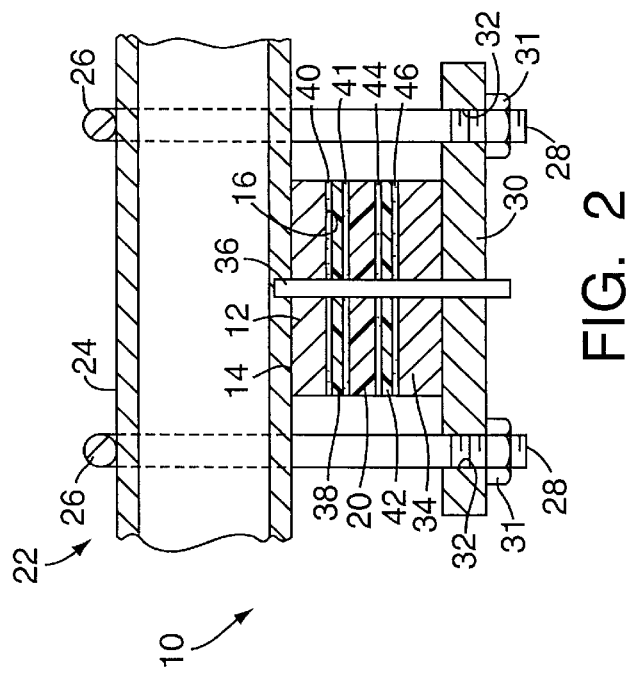

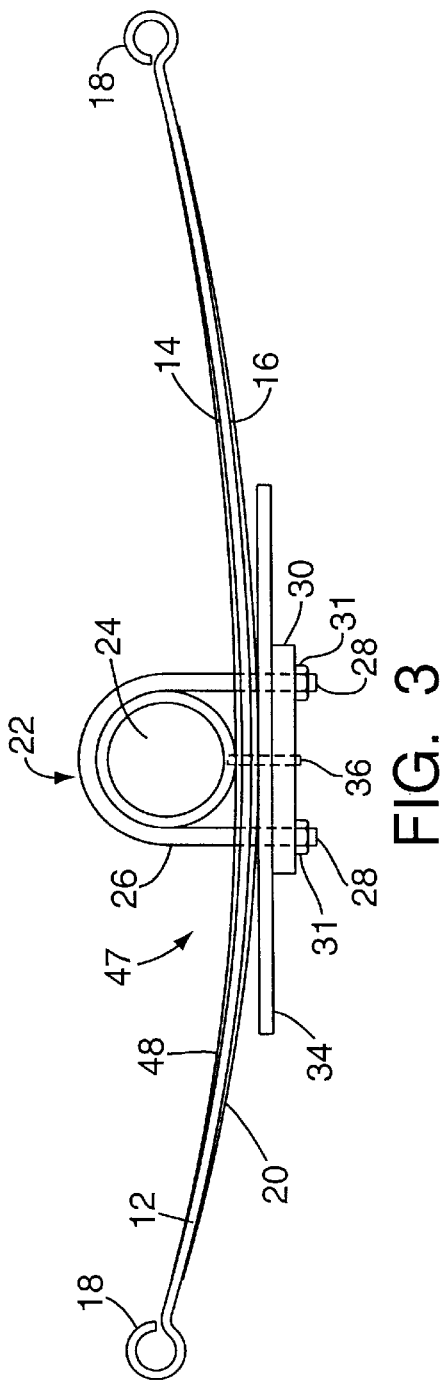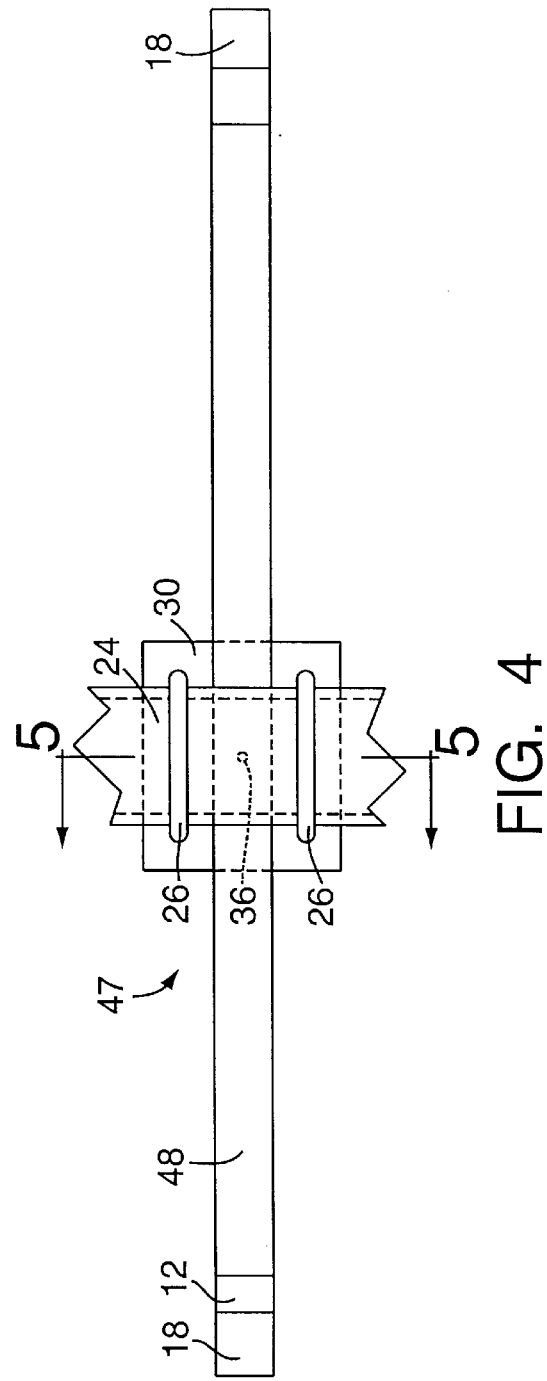

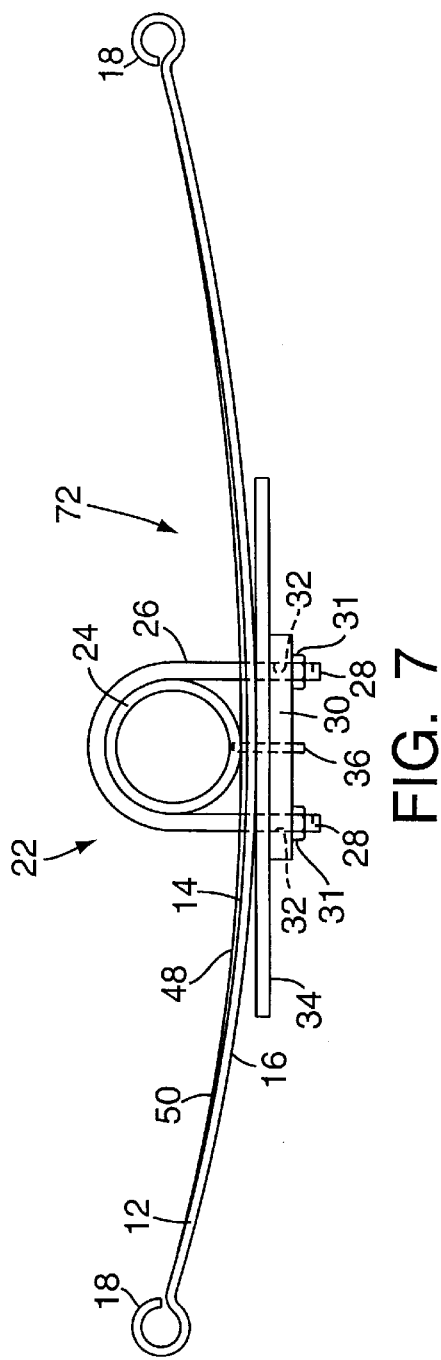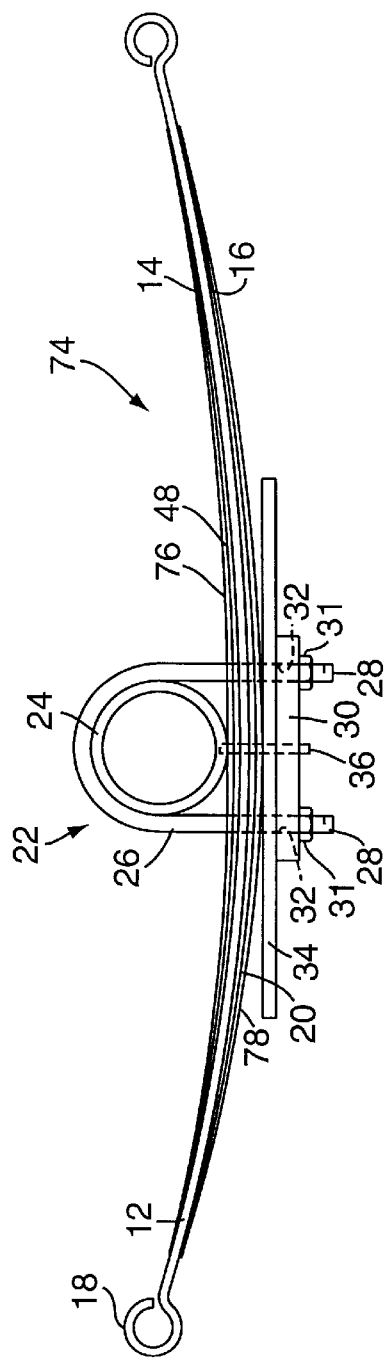

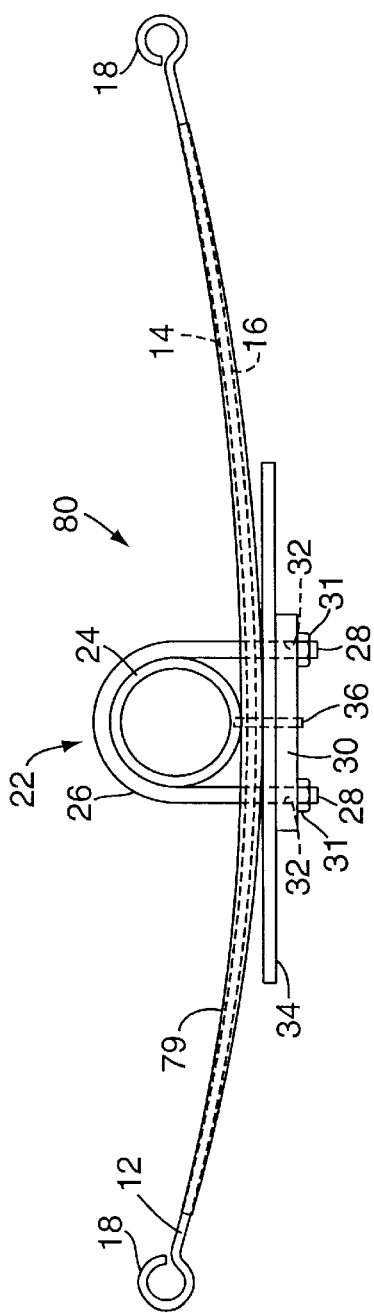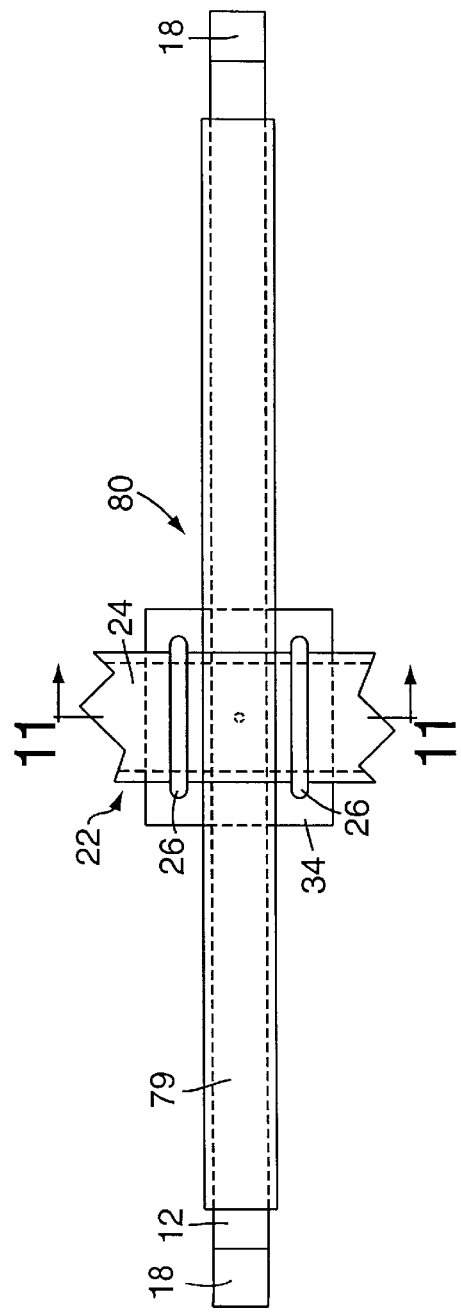

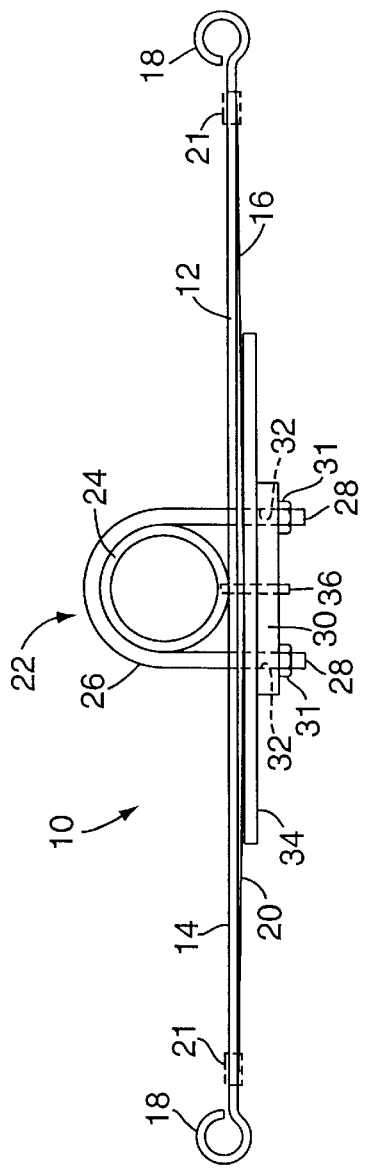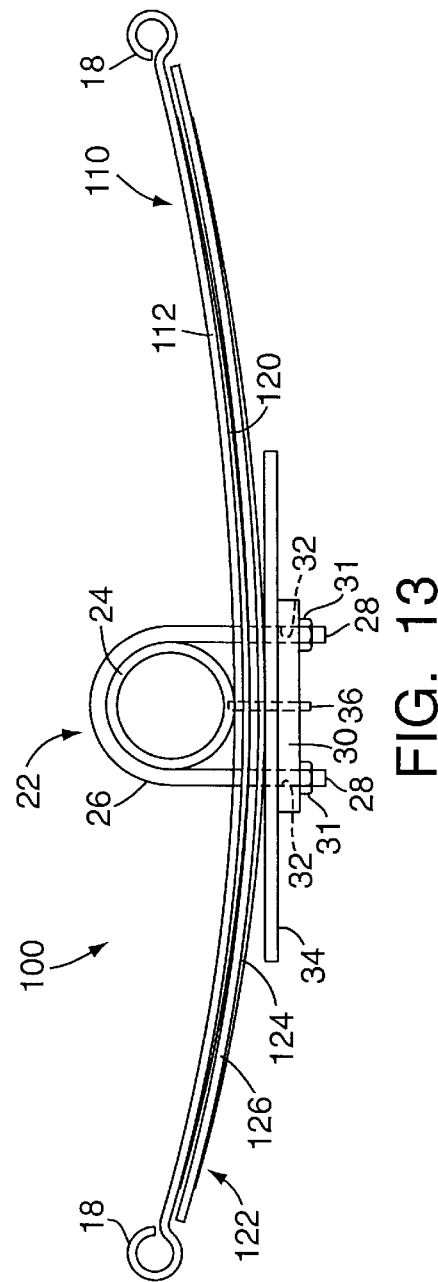

6,012,709

HYBRID LEAF SPRING AND SUSPENSION SYSTEM FOR SUPPORTING AN AXLE ON A VEHICLE

FIELD OF THE INVENTION

The present invention relates generally to vehicle suspension systems and more particularly to leaf springs incorporating layers of composite material.

BACKGROUND OF THE INVENTION

The present invention is related to leaf spring suspension systems for both motorized and non-motorized vehicles and is described herein as applied to such use.

Known leaf springs are constructed from several elongated strips or leaves of metal stacked one-on-top-of-the-other in a substantially parallel relationship and then clamped together. Typically, these springs are employed in vehicle suspension systems in one of two different load carrying configurations, cantilevered, or three-point-bending; the latter being the more common method of use. A cantilevered leaf spring is one where the leaf spring is fixed or supported at one end to the frame of a vehicle and coupled to an axle at its other end. Alternatively, a leaf spring mounted in three-point-bending, is supported or fixed at one end to a structure with the other end mounted such that it can float and the load is supported by the spring between its two ends. The use of leaf springs mounted in three point bending is so widespread that the Society of Automotive Engineers (SAE) has developed a formal leaf spring design and use procedure.

Metal leaf springs constructed in the manner described above are incorporated into a variety of different vehicle suspensions including, automobiles, light to heavy trucks, trailers, construction equipment, locomotives, and railroad cars. They are also employed in recreational vehicles, such as bicycles, snowmobiles, and ATV's (all terrain vehicles). The leaf springs mounted on the vehicles listed above, function to improve the smoothness of the vehicle's ride and to absorb and store energy for release in response to bending and/or impact loads imposed on the spring resulting from such things as encountering obstructions in a road during the vehicle's operation.

The mechanical properties defining a vehicle suspension system, particularly the spring rate and static deflection of the leaf springs, directly influence the smoothness of the vehicle's ride. Generally, a smooth ride requires the leaf springs to have large static deflections. The smoothness of the ride is also influenced by the vibration damping characteristics of the leaf springs. Damping is a parameter that quantifies the ability of the leaf spring to dissipate vibratory energy. Therefore, a high degree of damping is desirable in leaf springs used in automobiles to minimize the vibratory amplitudes transferred to the passenger area.

The ability to accurately determine the mechanical properties and performance characteristics of a leaf spring is critical to the proper design of vehicle suspension systems. One of the problems resulting from the construction of conventional leaf springs is that the variable lengths of the stack of individual leaves creates a stepped spring construction that only approximates constant stress, the steps tend to create localized areas of high stress known as stress concentrations which detrimentally affect the load carrying capability and useful life of the leaf spring. In addition, the fact that the springs are composed of lengths of metal stacked one-on-top-of-the-other causes them to be quite heavy, this additional weight causes a concomitant reduction in fuel economy.

Moreover, because it is impossible to predict the exact conditions and stresses that a leaf spring will be subjected to, the fatigue life of the spring is generally limited. This problem is further exacerbated by the build-up of foreign material on and between the individual leaves. Not only does this cause corrosion, thereby weakening the leaf spring and making it more susceptible to fatigue failure, but it also affects the stiffness of the leaf spring and hence the smoothness of the ride of the vehicle in which the spring is employed. Generally the magnitude of the contribution made to the strength of a particular leaf spring due to inter-leaf friction is determined empirically. When foreign material gets between the leaves it can dramatically increase, in the case of particulate matter, or decrease, in the case of oil, the friction between the leaves, thereby altering the original mechanical properties of the spring. In addition, the shear conductivity between the leaves, which is a measure of the amount of shear stress transferred from leaf-to-leaf, is typically low in conventional leaf springs because the individual leaves are only clamped at the ends. Therefore, the stress transfer capability along the length of the spring is dependent on the aforementioned inter-leaf friction.

In many applications, leaf springs are loaded not only by vertical forces but also by horizontal forces and torques in the longitudinal vertical and transverse vertical planes. These forces are typically generated when the brakes on the vehicle incorporating the leaf spring are applied. The aforementioned horizontal forces and torques cause the leaf spring to assume an "S" shaped configuration, a phenomena referred to as "S-ing". The stresses induced in the spring when this occurs can be quite high. In order to minimize S-ing in a leaf spring, the stiffness of the spring must be increased, however, this can detrimentally affect the smoothness of a vehicle's ride.

In order to address the above-described problems, those skilled in the art have attempted to fabricate purely composite leaf springs, wherein the individual leaves are formed from a composite material of the type consisting of a plurality of fibers embedded in a polymeric matrix. However, while these springs offered significant reductions in weight, as well as increased fatigue life and damping, their cost was prohibitive. The composite springs were also difficult to attach to the frame of a vehicle and required the use of special adapters.

Based on the foregoing, it is the general object of the present invention to provide a light weight, durable, cost effective leaf spring.

It is a more specific object of the present invention to provide a leaf spring incorporating composite materials that can be mounted to a vehicle's frame without the need for special adapters.

It is still another object of the present invention to provide a leaf spring having anti-S-ing capability while not diminishing the smoothness of a vehicle's ride.

It is yet a further object of the present invention to provide a leaf spring having increased shear conductivity.

SUMMARY OF THE INVENTION

The present invention meets these and other objects by providing in one aspect, a hybrid leaf spring having an elongated primary leaf element with a first modulus of elasticity, a compression surface, and an opposing tension surface. The primary leaf element also includes means for attaching it to the frame of a vehicle. At least one layer of composite material having a second modulus of elasticity different from the first modulus of elasticity is bonded to one of the surfaces of the primary leaf element. The aforementioned composite material is preferably composed of a plurality of elongated, substantially parallel fibers embedded in a polymeric matrix.

In a related aspect, a first layer of elastic material can be interposed between the primary and the at least one layer of composite material to provide damping and impact resistance to the hybrid leaf spring, as well as to absorb residual stresses at the interface between the primary leaf element and the layer of composite material resulting from contraction of the polymeric matrix during the curing process. The first layer of elastic material is bonded to one surface of the primary leaf element by a first layer of adhesive and to the at least one layer of composite material by a second layer of adhesive. Alternatively, the first layer of elastic material can be interposed between the primary leaf element and the at least one layer of composite material prior to curing the polymeric matrix. As the polymeric matrix cures and hardens, it will also act as its own adhesive bonding the first layer of elastic material to the at least one layer of composite material.

The present invention can also employ a second layer of composite material bonded to the other of the surfaces of the primary leaf element, thereby adding to the overall stiffness and damping capability of the leaf spring. A second layer of elastic material can also be positioned between said other surface of the primary leaf element and the second layer of composite material. The second layer of elastic material can be bonded to the other surface of the primary leaf element by a third layer of adhesive and to the second layer of composite material by a fourth layer of adhesive. Alternatively, and in the same manner described above, the second layer of composite material can be bonded to the second layer of elastic material by the polymeric matrix material forming part of the composite.

The hybrid leaf spring described above can also incorporate multiple layers of composite material positioned one-on-top-of-the-other and bonded to either or both the compression and tension surfaces of the primary leaf element. These composite layers can be defined by identical polymeric matrix materials and fibers, or they can vary from layer to layer.

In an alternate embodiment of the present invention, an encapsulated hybrid spring is provided, and is defined by a central metal leaf element encapsulated by a close coupled composite sleeve. A first layer of adhesive can be used to bond the sleeve to a respective one of the tension or compression surfaces of the primary leaf element and a second layer of adhesive can be used to bond the sleeve to the other surface, thereby bonding the composite sleeve to the primary leaf element. Alternatively, the polymeric matrix material forming part of the composite can be used to bond the tubular composite leaf to the primary leaf element. The composite sleeve is preferably fabricated from a composite material defined by a plurality of elongated substantially parallel fibers embedded in a polymeric matrix.

Another embodiment of the present invention, useful with heavy vehicles, employs two or more hybrid leaf springs mounted to the frame of a vehicle, one-on-top-of-the-other. In this manner the load carrying capability of a vehicle can be increased by simply adding more springs.

The above-described preferred and alternate embodiments of the present invention have several advantages over conventional all-steel leaf springs. One of the most significant advantages is that a conventional metallic primary leaf element is used as the core of the hybrid leaf spring with layers of composite material bonded to it. Therefore, the means by which the leaf spring is mounted to the frame of a vehicle can be incorporated into the metallic primary leaf element, avoiding the necessity for special adapters as are needed to mount known prior art all-composite leaf springs to the frames of vehicles.

A further advantage of the present invention is that the aforementioned layers of composite material weigh significantly less than steel leaves while still being able to withstand high loads. This results in lower overall vehicle weight which translates into higher fuel economy. The lower spring weight also allows for the use of lower weight hardware to couple the leaf spring to the frame of a vehicle.

Another advantage of the present invention resides in the fact that a lower outer surface stress is realized in the composite portion of the leaf spring due to the modulus of elasticity of the composite material being several orders of magnitude lower than that of the metallic primary leaf element. This results in a concomitant reduction in the stresses in the metallic primary leaf element to values below those encountered in similar conventional all-steel springs having an equivalent spring rate. Because the composite materials are bonded to the main steel leaf, resulting in enhanced shear conductivity, the use of composite layers results in a reduction in the overall thickness of the leaf spring. Since the outer stress in a leaf spring is directly proportional to the distance of the outer edge of the leaf spring from the neutral or centroidal axis of the spring, thinner leaf springs result in lower stress. This in turn translates into increased fatigue life of leaf springs incorporating the composite layers over that of conventional all-steel leaf springs. In addition, the use of composites having a lower modulus of elasticity results in a lower outer fiber stress. The resistance to "S-ing" is a result of the higher section modulus (stiffness) of the hybrid spring in comparison to the individual steel leaf stack that primarily depends on the stiffness of the steel main spring.

Yet another advantage of the present invention arises from the fact that laminating two or more engineering materials together that have different moduli of elasticity results in a spring system having a greater degree of damping than if the leaf spring were constructed of a single material. This is primarily due to the fact that the natural frequencies (e.g. the frequency at which a given system will vibrate of its own accord) of the individual materials differ, thereby resulting in an increase in damping and quicker energy dissipation, to a given vibratory input. In addition, incorporation of the layers of elastic material between the primary leaf element and the layers of composite material also adds to the damping capability of the hybrid leaf spring.

A further advantage of the present invention is that the bonded structure of the hybrid leaf spring prevents the ingestion of foreign material between the leaves of the spring. Therefore, the mechanical properties and performance of the leaf spring of the present invention are much less likely to deteriorate over time as do those of conventional all-steel springs.

Still a further advantage of the present invention is that the shear conductivity between the primary leaf and the layers of composite material is increased due to the layers of composite material being bonded along their lengths, to the primary leaf.

BRIEF DESCRIPTION OF THE DRAWINGS

These and other features, aspects, and advantages of the present invention will become better understood with regard to the following description, appended claims, and accompanying drawings where:

FIG. 1 is a front elevational view of the leaf spring of the present invention;

FIG. 2 is a cross-sectional side view of the leaf spring of FIG. 1;

FIG. 3 is a front elevational view of an alternate embodiment of the leaf spring of the present invention;

FIG. 4 is a top plain view of the leaf spring of FIG. 3;

FIG. 7 is a front elevational view of a further embodiment of the leaf spring of the present invention;

FIG. 8 is a front elevational view of a further embodiment of the leaf spring of the present invention;

FIG. 9 is a front elevational view of a further embodiment of the leaf spring of the present invention;

FIG. 10 is a top plan view of the leaf spring of FIG. 9;

FIG. 12 is a cross-sectional side view of another embodiment of the leaf spring of FIG. 1; and FIG. 13 is a side elevational view of still another embodiment of the leaf spring.

DETAILED DESCRIPTION OF THE PREFERRED EMBODIMENTS

Figure 5:
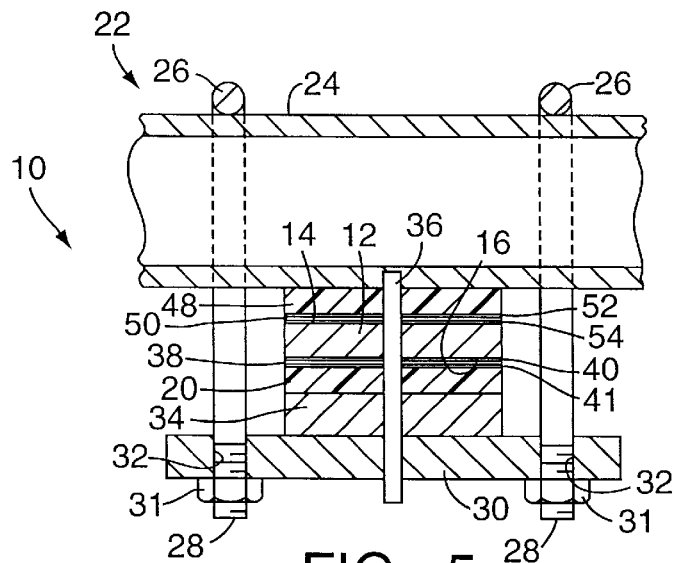
FIG. 5 is a sectional view taken through line 5—5 in FIG. 4, of the leaf spring of FIG. 4.

Referring to FIG. 1, one preferred embodiment of a hybrid leaf spring generally designated as 10, includes, an elongated primary leaf element 12, having a first modulus of elasticity, a tension surface 14, an opposing compression surface 16, and mounting means 18, shown as, but not limited to mounting eyes formed integrally with the ends of the elongated primary leaf element, for coupling the leaf to a vehicle frame. The elongated primary leaf element 12 is also formed from a suitable material, such as, but not limited to metal, preferably steel, having an elastic modulus higher than the above-described composite material. Alternatively, the primary leaf element 12, and the at least one layer of composite material 20 can be fabricated from a metal-matrix-composite material which consists of a plurality of fibers imbedded in a metallic matrix.

At least one layer of composite material 20 is positioned substantially parallel to, and bonded to one of the surface, such as the compression surface 16, of the primary leaf element 12.

The hybrid leaf spring 10 is preferably fabricated by bonding the layer of composite material 20 to the primary leaf 12 and placing the assembled components in a press employing a heated die having a shape conforming to the desired unloaded shape of the finished hybrid leaf spring. The components are then pressed together and through the combination of heat and pressure hybrid leaf springs of consistent repeatable shape can be formed.

In the illustrated embodiment, the layer of composite material 20 is contoured along the length of the primary leaf element 12, being generally thickest at the location of the axle attachment but not limited to the center of the primary leaf element and tapering toward each end. This tapered configuration provides for a substantially constant stress spring by placing the greatest amount of composite material at the point of highest stress and gradually reducing the thickness of the composite material toward the point of lowest stress near the mounting means 18 on the primary leaf element 12. In addition, retaining means 21, preferably in the form of a metal band is wrapped around both the primary leaf element 12 and the opposed ends of the layer of composite material 20 to prevent the layer of composite material from delaminating away from the primary leaf element. The layer of composite material 20 is preferably formed from a plurality of substantially parallel fibers embedded in a polymeric matrix.

The fibers forming part of the layer of composite material 20, can be of the inorganic "E" glass and high strength "S" glass or organic (synthetic) carbon, aramid, or polyethylene type, with a modulus of elasticity range of approximately 10.5–55 million psi, and an allowable stress range of approximately 300,000–600,000 psi; however, the invention is not limited in this regard as other fiber types known to those skilled in the art of formulating composites such as boron fibers may be substituted without departing from the broader aspects of the invention. In addition to the foregoing, the polymeric matrix into which the aforementioned fibers are embedded is preferably of the thermosetting, or thermoplastic type, such as, but not limited to, polyester, vinylester, epoxy, nylon or polyethylene with an elastic modulus from approximately 200,000 to 2 million psi and a shear strength of approximately 2000–9000 psi.

Referring to FIGS. 1 and 2, clamping means 22 is employed to couple the leaf spring 10 in a three-point-bending configuration to an axle 24 of a vehicle. In the illustrated embodiment, clamping means 22 includes a pair of U-bolts 26 extending around the axle 24 with the leaf spring 10 being received between the U-bolts. A locking plate 30 defining 2 pairs of apertures 32 for receiving ends 28 of the U-bolts 26 is positioned adjacent to the layer of composite material 20 and fastening means 32 are threadably engaged with the ends of the U-bolts for releasably clamping the U-bolts and the leaf spring 10 onto the axle 24. In addition, a load leaf 34, for enhancing the load carrying capacity of the leaf spring in the area of highest stress, is interposed between the at least one layer of composite material 20 and the locking plate 30. The load leaf 34 can be bonded to the layer of composite material 20 or it can be retained in contact with the layer of composite material by the clamping means 22. The load leaf 34 can be either curved or flat and constructed of either a metallic or composite material.

In order to properly position the leaf spring 10 along the axle 24, positioning means 36 is engaged with the axle, and in the illustrated embodiment extends through the leaf spring 10, the load leaf 34, and the locking plate 30 and into the axle 24 thereby fixing the position of the leaf spring relative to the axle. The positioning means 36 may take various forms, and in the illustrated case is a pin, however, a bolt can also be used without departing from the broader aspects of the present invention.

As shown in FIG. 2, a first layer of elastic material 38 can be interposed between the primary leaf element 12 and the layer of composite material 20 to increase the damping, provide impact resistance, and to compensate for any residual stresses that might otherwise be induced in the spring at the interface between the primary leaf element and the layer of composite material resulting from contraction of the polymeric matrix during curing. The first layer of elastic material 38 is made from a suitable material, such as, but not limited to natural or synthetic rubber, thermoset plastic, or thermoplastic elastomers. The first layer of elastic material 38 can be bonded on one surface to the compression surface 16 of the primary leaf element 12 via a first layer of adhesive 40 and on an opposing surface to the layer of composite material 20 by a second layer of adhesive 41.

Alternatively, the first layer of elastic material 38 can be bonded to the primary leaf element 12 by the material constituting the layer of composite material 20. Prior to forming the composite material the first layer of elastic material can be positioned on the primary leaf element 12 such that the layer of composite material 20 can then be formed or molded onto the primary leaf element 12 and the first layer of elastic material 38, with the polymeric matrix material constituting part of the composite encapsulating the elastic material and acting as the adhesive for bonding the first layer of elastic material 38 to the primary leaf element 12.

In order to ensure a sufficiently strong adhesive bond between the first layer of elastic material 38 and the layer of composite material 20, the layer of composite material is typically surface treated, or prepared for bonding, by sanding or mechanically roughing the surface of the layer of composite material that will contact the adhesive and then thoroughly cleaning the surface. In addition, and dependent upon the type of composite material used, a flame treatment or corona discharge process may be used to prepare the surface for bonding. The first layer of elastic material is also typically prepared for bonding by such processes as sanding, flame or corona discharge treatments, cold plasma treatments or acid etching and texturing. Corona discharge processes operate on the principal that an air gap between an electrode and the surface of the product has a lower dielectric breakdown voltage than the product itself. As high frequency, high voltage power is applied from the electrode, and across the air gap to the substrate, the air in the gap becomes ionized and forms a gaseous conductor seen as a bluish corona. The ionized air gap is caused by the acceleration of electrons moving away from the electrode surface. As the electrons accelerate, they gain sufficient energy to cause an avalanche of electrons, which in turn creates oxidative molecules that tend to break the molecular bonds on the surface of most substrates causing the surface to oxidize. This oxidation increases the surface energy which allows for better wetting by liquids.

In addition to the corona discharge process, cold plasma processes are used on the preparation of polymers and elastomers for bonding. Cold plasma treatments typically employed include, activating plasmas, grafting processes, and plasma polymerization. Activating plasmas use a gas that reacts with the chemistry of the product,. Such plasmas use oxygen, ammonia, air, halogens, and other gases for etching and stripping surface material. Grafting processes create free radicals on the polymer surface by exposure to a noble gas plasma, followed by a bathing of the surface in the vapor of an unsaturated monomer. The free radicals on the polymer surface initiate grafting reactions with the reactive monomers. Plasma polymerization utilizes plasma energy to initiate gas-phase polymerization and deposition onto a substrate within the plasma chamber. After the above-described surfaces have been prepared for bonding, the aforementioned layers of adhesive, must provide sufficient bonding strength, therefore, adhesives having lap shear strengths greater than 2,000 psi are typically employed.

Still referring to FIG. 2, a second layer of elastic material 42 can be interposed between the load leaf 34 and the layer of composite material 20 with a third layer of adhesive 44 bonding the second layer of elastic material to the layer of composite material and a fourth layer of adhesive 46 bonding the second layer of elastic material to the load leaf 34.

Alternatively, and in the same manner as described above, the polymeric matrix material comprising part of the layer of composite material can be used to encapsulate the second layer of elastic material 42 and bond the layer of composite material and the second layer of elastic material to the primary leaf 12, thereby obviating the need for adhesive layers 44 and 46.

FIGS. 3–5 illustrate another embodiment of the hybrid leaf spring, generally designated as 47, in which earlier described elements bear the same reference numerals. In this embodiment, in addition to the first layer of composite material 20 on the compression surface, a second layer of composite material 48, preferably also formed from a plurality of substantially parallel fibers embedded in a polymeric matrix, is bonded to the tension surface 14 of the primary leaf element 12. Due to the fact that most composite materials exhibit greater tensile than compressive strength, it is preferable in the embodiment of FIG. 3 that the first layer of composite material 30 bonded to the compression surface 16 of the primary leaf element 12 be thicker than the second layer of composite material 48 bonded to the tension surface of the primary leaf element. The increased thickness of the layer of composite material 20 relative to the layer of composite material 48 bonded to the compression surface 16 of the primary leaf element 12 gives the layer of composite material 20 the ability to sustain compressive stresses in proportion to the tensile stresses imposed on the layer of composite material 20. In addition, the increased thickness of the layer of composite material 48 bonded to the compression surface 16 causes the centroidal or neutral axis of the hybrid leaf spring to shift towards the compression surface 14 of the spring, thereby decreasing the outer fiber compression stress. This results in a concomitant reduction in the compression stresses induced in the primary leaf 12 and the layer of composite material 20.

As shown in FIG. 5, a third layer of elastic material 50 can be interposed between the second layer of composite material 48 and the tension surface 14 of the primary leaf element 12 and a fifth layer of adhesive 52 bonds the third layer of elastic material 50 to the second layer of composite material 48 with a sixth layer of adhesive 54 bonding the third layer of elastic material to the tension surface 14 of the primary leaf element 12.

Alternatively, and as described above, the polymeric matrix material forming part of the second layer of composite material 48 can be used to bond the third layer of elastic material 50 to the primary leaf element 12.

Figure 6:
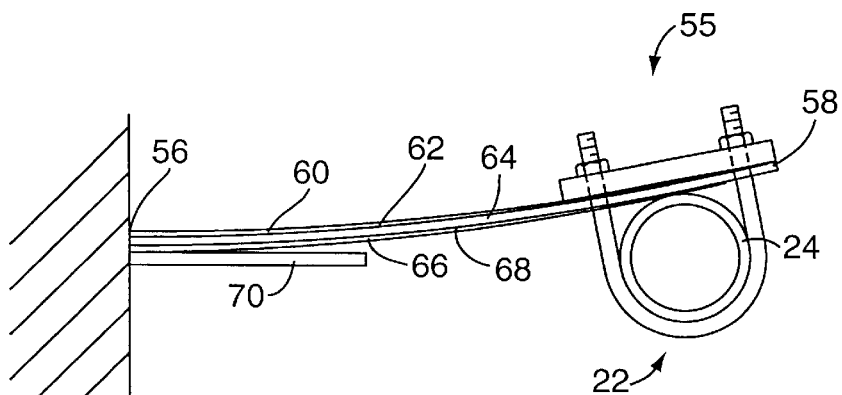
FIG. 6 is a front elevational view of the leaf spring of a further embodiment used as a cantilevered beam.

Referring to FIG. 6, while the embodiments of the present invention shown in FIGS. 1–5 illustrate a hybrid leaf spring mounted in three-point-bending, it is also possible to employ the invention in a cantilevered configuration. Accordingly, FIG. 6 illustrates a hybrid leaf spring 55 having a first end 56 mounted to a structure, such as, but not limited to, the frame of an automobile. The opposite end 58 is coupled to a vehicle's axle 24 in the same manner as in the previously described embodiments, via clamping means 22. A first layer of composite material 60 is bonded to the tension surface 62 of the primary leaf 64, and a second layer of composite material 66 is bonded to the compression surface 68 of the primary leaf. A load leaf 70 is also provided and can be bonded to the second layer of composite material 66, or it can simply engage the second layer of composite material.

It is also possible to construct a hybrid leaf spring by employing only the aforementioned second layer of composite material 48 bonded to the tension surface 14 of the primary leaf element 12. Such a hybrid leaf spring is illustrated in FIG. 7 and is generally designated by the reference numeral 72 in which earlier described elements bear the same reference numerals. The third layer of elastic material 50, FIG. 5 can be interposed between and bonded to the second layer of composite material 48 and the tension surface 14 of the primary leaf element 12. In the illustrated embodiment, the overload leaf 34 is positioned between and in communication with the compression surface 16 of the primary leaf element 12 and the locking plate 30, with the clamping means 22 coupling the leaf spring to the vehicle's axle 24.

Referring to FIG. 8 the hybrid leaf spring of the present invention, there shown and generally designated by the reference numeral 74 can also employ multiple layers of composite material stacked one-on-top-of-the-other and bonded to both the tension surface 14 and the compression surface 16 of the primary leaf element 12. As illustrated, a third layer of composite material 76 is bonded to the second layer of composite material 48, with a fourth layer of composite material 78 bonded to the at least one layer of composite material 20. As with the previous embodiments of the present invention, layers of elastic material can be interposed between and bonded to the second and third layers of composite material, 48 and 76 respectively, and the at least one and the fourth layers of composite material, 20 and 78 respectively.

Figure 11:
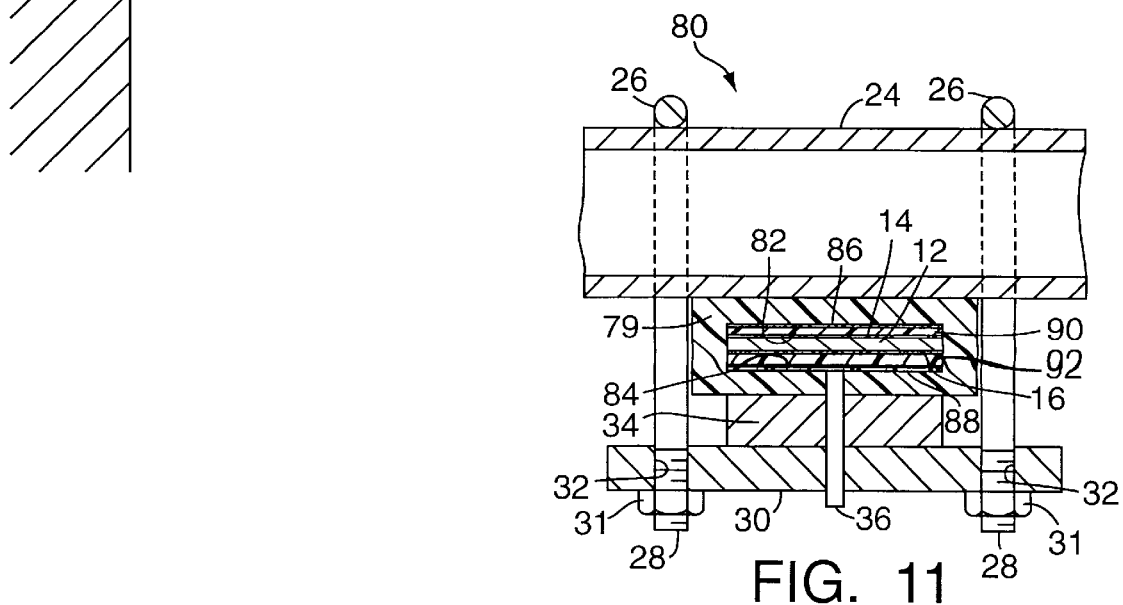
FIG. 11 is a partial cross sectional view taken through line 11—11 in FIG. 10, of the leaf spring of FIG. 9.

Turning to FIGS. 9–11, an alternate embodiment of the present invention wherein the primary leaf 12 is encapsulated by a composite sleeve 79, is generally designated by the reference numeral 80 in which earlier described elements bear the same reference numerals. The composite sleeve 79 defines an upper interior wall 82 and a lower interior wall 84. A first layer of adhesive 86 bonds the tension surface 14 of the primary leaf element 12 to the upper interior wall 82, and a second layer of adhesive 88 bonds the compression surface 16 of the primary leaf element to the lower interior wall 84. The composite sleeve is preferably formed from a material consisting of a plurality of substantially parallel fibers embedded in a polymeric matrix. However, the invention is not limited in this regard as other materials, such as metal matrix composites can be substituted without departing from the broader aspects of the invention. In addition, and as best shown in FIG. 11, a first layer of elastic material 88 can be positioned between, and bonded to the upper interior wall 82 and the tension surface 14 of the primary leaf element 12, and a second layer of elastic material 90 can be positioned between, and bonded to the lower interior wall 84 and the compression surface 16 of the primary leaf element.

While the leaf springs of the present invention have been depicted as being arcuate, the invention is not limited in this regard as other configurations, such as, but not limited to that of FIG. 12 wherein the leaf spring is illustrated as having no initial curvature.

As shown in FIG. 13, multiple leaf springs 100 can be mounted to the frame of a vehicle, one-on-top-of-the-other, where greater load carrying capability than is practically achievable using a single leaf spring is desired. In the illustrated embodiment, a leaf spring 110 having a primary leaf element 112 and at least one layer of composite material 120 bonded to the primary leaf element, is mechanically coupled by clamping means 22 to a second leaf spring 122 also having at least one layer of composite material 124 bonded to a second primary leaf element 126. In this manner, the second leaf spring 122 assumes a portion of the load imposed on the first leaf spring.

While preferred embodiments have been shown and described, various modifications and substitutions may be made without departing from the spirit and scope of the invention. Accordingly, it is to be understood that the present invention has been described by way of example and not by limitation.

What is claimed is:

1. A hybrid leaf spring comprising:
   a non-elastomeric, elongated primary leaf element having a compression surface, an opposing tension surface, a first modulus of elasticity, and including means for attaching the primary leaf to a vehicle's frame; and
   at least one layer of a non-elastomeric composite material having a second modulus of elasticity different from the first modulus of elasticity, substantially parallel to and bonded to a respective one of the tension or compression surfaces of the elongated primary leaf element.

2. A hybrid leaf spring as defined by claim 1, wherein the at least one layer of composite material is contoured along the length of the primary leaf.

3. A hybrid leaf spring as defined by claim 1, further comprising a first layer of elastic material interposed between the primary leaf element and the at least one layer of composite material.

4. A hybrid leaf spring as defined by claim 3 further comprising:
   a first layer of adhesive positioned between and bonding the first layer of elastic material to one of the tension or compression surfaces of the primary leaf element; and
   a second layer of adhesive positioned between and bonding the first layer of elastic material to the at least one layer of composite material.

5. A hybrid leaf spring as defined by claim 1, wherein the modulus of elasticity of the at least one layer of composite material is less than the modulus of elasticity of the primary leaf element.

6. A hybrid leaf spring as defined by claim 1, wherein:
   the primary leaf element is metal and the at least one layer of composite material is defined by a plurality of substantially parallel fibers embedded in a polymeric matrix material.

7. A hybrid leaf spring as defined by claim 1, wherein the primary leaf element and the at least one layer of composite material are formed from a metal matrix composite material defined by a plurality of fibers embedded in a metallic matrix material.

8. A hybrid leaf spring as defined by claim 1, wherein:
   the at least one layer of composite material includes opposed ends; and
   retaining means are positioned at each of the opposed ends for preventing the layer of composite material from delaminating from the primary leaf element.

9. A hybrid leaf spring as defined by claim 8, wherein the retaining means are a pair of bands wrapped around the primary leaf element and the at least one layer of composite material.

10. A hybrid leaf spring as defined by claim 1, wherein the hybrid leaf spring is arcuate in the unloaded condition.

11. A hybrid leaf spring as defined by claim 1, wherein the hybrid leaf spring is straight in the unloaded condition.

12. A hybrid leaf spring as defined by claim 1, further comprising:
   at least one second layer of composite material bonded to the other of the tension and compression surface of the elongated primary leaf element.

13. A hybrid leaf spring as defined by claim 12, wherein the layer of composite material bonded to the compression surface is thicker than the layer of composite material bonded to the tension surface.

14. A hybrid leaf spring as defined by claim 4, further comprising:
   a second layer of composite material bonded to the other of the tension and compression surfaces of the primary leaf element;
   a second layer of elastic material interposed between the primary leaf element and the second layer of composite material;
   a third layer of adhesive positioned between and bonding the second layer of elastic material to the compression surface of the primary leaf element; and
   a fourth layer of adhesive positioned between and bonding the second layer of elastic material to the second layer of composite material.

15. A hybrid leaf spring as defined by claim 1, further comprising an overload leaf bonded to the at least one layer of composite material.

16. A hybrid leaf spring as defined by claim 1, wherein:
   the primary leaf element includes opposed ends; and
   the means for mounting the leaf spring to a vehicle's frame includes at least one mounting eye coupled to at least one of the opposed ends.

17. A hybrid leaf spring comprising:
   a non-elastomeric, primary leaf element having a compression surface, a tension surface, and including means for attaching the primary leaf to a vehicle's frame; and
   a non-elastomeric composite sleeve encapsulating the primary leaf.

18. A hybrid leaf spring as defined by claim 17, wherein:
   the composite sleeve defines upper and lower interior walls;
   a first layer of adhesive is positioned between and bonds the compression surface to the upper interior wall; and
   a second layer of adhesive is positioned between and bonds the tension surface to the lower interior wall.

19. A hybrid leaf spring as defined by claim 18, further comprising:
   a first layer of elastic material interposed between the compression surface and the upper interior wall, and bonded to the compression surface by the first layer of adhesive;
   a third layer of adhesive positioned between, and bonding the first layer of elastic material to the compression surface;
   a second layer of elastic material interposed between the tension surface and the lower interior wall, the second layer of elastic material being bonded to the tension surface by the second layer of adhesive; and
   a fourth layer of adhesive positioned between, and bonding the second layer of elastic material to the tension surface.

20. A hybrid leaf spring as defined by claim 17, wherein:
   the primary leaf element includes opposed ends; and
   the means for attaching the primary leaf element to a vehicle's frame includes at least one mounting eye coupled to at least one of the opposed ends of the primary leaf element and extending outwardly from an end of the composite sleeve.

21. A hybrid leaf spring as defined by claim 17 further comprising a load leaf coupled to the composite sleeve.

22. A hybrid leaf spring as defined by claim 17, wherein:
   the composite is formed from a material defined by a plurality of substantially parallel fibers embedded in a polymeric matrix material.

23. A hybrid leaf spring suspension system for supporting an axle on a vehicle frame, comprising:
   a non-elastomeric, primary leaf element having a compression surface, a tension surface, a first modulus of elasticity, and including means for attaching the primary leaf to a vehicle frame;
   at least one layer of a non-elastomeric composite material bonded to a respective one of the tension or compression surfaces of the primary leaf element, the at least one layer of composite material having a second modulus of elasticity different from the first modulus of elasticity; and
   clamping means for coupling the hybrid leaf spring suspension system to the axle.

24. A hybrid leaf spring suspension system for supporting an axle on a vehicle frame as defined by claim 23, further comprising a load leaf interposed between the clamping means and the hybrid leaf spring suspension system.

25. A hybrid leaf spring suspension system for supporting an axle on a vehicle frame as defined by claim 23, wherein the clamping means comprises:
   a pair of u-bolts extending around the axle and having threaded ends, the hybrid leaf spring suspension system being received between the pair of u-bolts;
   a locking plate defining two pairs of apertures for receiving the threaded ends of the u-bolts, the locking plate being positioned on top of the hybrid leaf spring suspension system;
   fastening means threadably engaged with the threaded ends of the u-bolts for releasably clamping the locking plate onto the hybrid leaf spring suspension system; and
   locating means extending through the locking plate and the hybrid leaf spring suspension system and engaging the axle, thereby releasably fixing the position of the hybrid leaf spring suspension system along the axle.

26. A hybrid leaf spring suspension system as defined by claim 23, wherein the at least one layer of composite material is defined by a plurality of substantially parallel fibers embedded in a polymeric matrix.

27. A hybrid leaf spring suspension system as defined by claim 23 wherein, at least one of the primary leaf element or the at least one layer of composite material is formed from a metal matrix composite material.

28. A hybrid leaf spring comprising:
   a first non-elastomeric leaf spring for mounting to a vehicle frame, having a primary leaf element, at least one layer of a non-elastomeric composite material bonded to the primary leaf element, and mounting means coupled to the primary leaf element and the vehicle frame; and
   at least a second non-elastomeric leaf spring coupled to the first leaf spring and having a second primary leaf element and at least one second layer of a non-elastomeric composite material bonded to the second primary leaf element.

* * * * *